United States Patent
Amerga et al.

(10) Patent No.: US 7,095,813 B2
(45) Date of Patent: Aug. 22, 2006

(54) SYSTEM AND METHOD FOR THE DETECTION AND COMPENSATION OF RADIO SIGNAL TIME OF ARRIVAL ERRORS

(75) Inventors: Messay Amerga, Diego, CA (US); Roland Rick, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 794 days.

(21) Appl. No.: 10/150,687

(22) Filed: May 16, 2002

(65) Prior Publication Data

US 2003/0215035 A1 Nov. 20, 2003

(51) Int. Cl.
*H04L 27/06* (2006.01)

(52) U.S. Cl. .................................................... 375/343

(58) Field of Classification Search ................ 375/343, 375/316, 130, 142, 147, 150; 342/357.06; 701/215, 207
See application file for complete search history.

(56) References Cited

U.S. PATENT DOCUMENTS

| | | | | |
|---|---|---|---|---|
| 5,828,694 | A | | 10/1998 | Schipper ...................... 375/208 |
| 6,198,765 | B1 | | 3/2001 | Cahn et al. .................. 375/142 |
| 6,665,333 | B1 | * | 12/2003 | McCrady et al. ........... 375/147 |
| 6,707,422 | B1 | * | 3/2004 | Sheynblat et al. ..... 342/357.12 |
| 6,804,494 | B1 | * | 10/2004 | Fernandez-Corbaton et al. ............................ 455/65 |
| 2002/0118723 | A1 | * | 8/2002 | McCrady et al. ........... 375/130 |
| 2003/0115027 | A1 | * | 6/2003 | Fernandez-Corbaton et al. 703/2 |

FOREIGN PATENT DOCUMENTS

| | | |
|---|---|---|
| EP | 1089452 | 4/2001 |
| WO | 03001699 | 1/2003 |

* cited by examiner

*Primary Examiner*—Tesfaldet Bocure
(74) *Attorney, Agent, or Firm*—Philip Wadsworth; Bruce Greenhaus; James McFarland

(57) ABSTRACT

A system and method to reduce the effects of TOA errors. A mobile unit, generates a correlation pulse when a signal transmitted from a base station is detected. The transmitted signal may be reflected or defracted such that multipath signals arrive at the mobile unit, leading to distortion in the generated correlation pulse and errors in accurate TOA measurements. The system models the response function and calculates the width of the pulse using the modeling function with a dynamically adjustable factor to indicate at what point down from the peak the pulse width will be calculated. Based on calculation of pulse width, a type of multipath signal may be determined and an appropriate correction factor applied to the measured TOA to provide a more accurate TOA determination. The system may apply correction factors to TOA signals from base stations in a mobile telephone unit or from signals received from GPS satellites.

23 Claims, 7 Drawing Sheets

SYSTEM AND METHOD FOR THE DETECTION AND COMPENSATION OF RADIO SIGNAL TIME OF ARRIVAL ERRORS

BACKGROUND OF THE INVENTION

1. Field of the Invention

The present invention is related generally to telecommunication and, more specifically, to a technique for detecting and compensating for time of arrival errors in a telecommunications system.

2. Description of the Related Art

Emergency services are often requested using telephone numbers, such as "911." If the caller is in a fixed location, such as a residence, computer systems track the telephone number of an incoming telephone call using automatic number identification (ANI) and quickly determine the address from which the call originated. Thus, it is a relatively simple task to determine the location from which emergency services are requested.

The location of a user requesting emergency service via mobile communications, such as cellular telephones, personal communication systems (PCS) devices and the like, is not as easily determined. Radio triangulation techniques have long been used to determine the location of a mobile unit. However, such radio triangulation techniques are known to be inherently inaccurate. Errors on the order of thousands of meters are not uncommon. However, such errors are unacceptable for the delivery of emergency services.

The Federal Communications Commission (FCC) has ordered changes in communication technology that will permit greater accuracy in location determination. In the case of mobile communications, the FCC has generated a rule that requires infrastructure based location systems to have an accuracy of 150 meters 67% of the time (and an accuracy of 300 meters 95% of the time). For systems that require modified handsets, the FCC has decreed that such systems must determine location within 50 meters 67% of the time (and 150 meters 95% of the time).

Existing position location technologies based on global positioning system (GPS) use a network of satellites in the sky that transmit signals at a known time. A GPS receiver on the ground measures the time of arrival of the signals from each satellite it can detect. The time of arrival, along with the exact location of the satellites and the exact time the signal was transmitted from each satellite is used to triangulate the position of the GPS receiver. A typical GPS receiver requires four satellites to make a triangulation, and the performance of the resulting calculation increases as the number of satellites that can be detected increases.

In an alternative to GPS, an existing network of cellular base stations can be treated as a network of satellites for purposes of position location. Similar to GPS technology, the exact location of each base station, the exact time at which the base station is transmitting a signal, and the time of arrival of the base station signal at a mobile station can be used to triangulate the position of the mobile station. This technique is described by some service providers as advanced forward link trilateration (AFLT). A significant problem faced by the mobile station is to measure the time of arrival with the signals that are received from each base station. Different wireless technologies may take different approaches to time of arrival measurements. Code division multiple access (CDMA) is one such technology. CDMA modulation is one of several techniques that allow a large number of system users to share a communication system. It is possible to utilize conventional CDMA modulation techniques as part of an AFLT system.

Radio location systems use time of arrival (TOA) signals coming from different transmitters of known positions to triangulate and estimate the mobile unit location. However, TOA signals are often distorted or erroneous due to multiple transmission paths or the unavailability of a line of sight between the network antenna and the mobile station. FIG. 1 illustrates an example of multiple transmission paths that may be experienced by a mobile phone in a vehicle 10. In the example illustrated in FIG. 1, the mobile unit 10 is receiving signals from transmitters 12 and 14 mounted atop towers. In the example of FIG. 1, the mobile unit 10 receives a signal directly from the transmitters 12 and 14 but also receives signals from the transmitter 14 that have reflected off nearby buildings. Thus, the mobile unit 10 receives a number of signals from the transmitter 14. In the example illustrated in FIG. 1, the mobile unit 10 is not within the line of sight (LOS) of the transmitter 16. That is, buildings or other structures block the direct line of sight between the mobile unit 10 and the transmitter 16. However, the mobile unit 10 still detects signals from the transmitter 16 that are reflected off buildings or other structures or are defracted around edges of buildings or other structures. In addition, the mobile unit 10 receives signals from a transmitter 16 mounted atop a building and may also receive signals from a global positioning system (GPS) satellite 18 in orbit about the earth. As a result, the mobile unit 10 receives multiple signals from the transmitter 16, none of which are direct LOS signals. Signals from the GPS satellite 18 may also comprise both LOS signals and reflected signals.

As a result of such multipath signals, the time of arrival measurements by the mobile unit are subject to error. Such errors can be significant in the presence of multipath signals, thus making it difficult or impossible to achieve the FCC directives with regard to location accuracy. Therefore, it can be appreciated that there is a significant need for a system and method to improve TOA measurements for mobile location systems. The present invention provides this and other advantages that will be apparent from the following detailed description and accompanying figures.

BRIEF SUMMARY OF THE INVENTION

The present invention is embodied in a system and method for the correction of multipath errors in a telecommunication device. In an exemplary embodiment, the system comprises a searcher to analyze received signals and to determine a correlation signal at predetermined points in time. The searcher determines a maximum signal level at a selected one of the predetermined points in time. A signal analyzer generates a mathematical model of a predetermined response function using the maximum signal level and correlation signal levels from predetermined points in time adjacent the select time. The signal analyzer uses the mathematical model to determine an actual peak level and a pulse width associated with the predetermined response function and applies a correction factor to a time of arrival based on the pulse width in order to generated a corrected time of arrival.

In one embodiment, the pulse width is determined at a point on the mathematical model where the correlation signal level is less than the actual peak level by a predetermined amount. In an exemplary embodiment, the signal analyzer may dynamically select the predetermined amount.

The signal analyzer may select the predetermined amount based on a signal-to-noise ratio of the received signal.

In an exemplary embodiment, the correlation signal levels are based on received signal strength of the received signals. The maximum signal level and correlation signal levels from predetermined points in time adjacent the selected time may be used to determine coefficients in the mathematical model. In an exemplary embodiment, the coefficients in the mathematical model are used to determine the pulse width of the mathematical model. In one embodiment, the mathematical model is a second-order mathematical function. In an alternative embodiment, the mathematical model is a mathematical function greater than a second-order function.

DETAILED DESCRIPTION OF THE INVENTION

Figure 1:
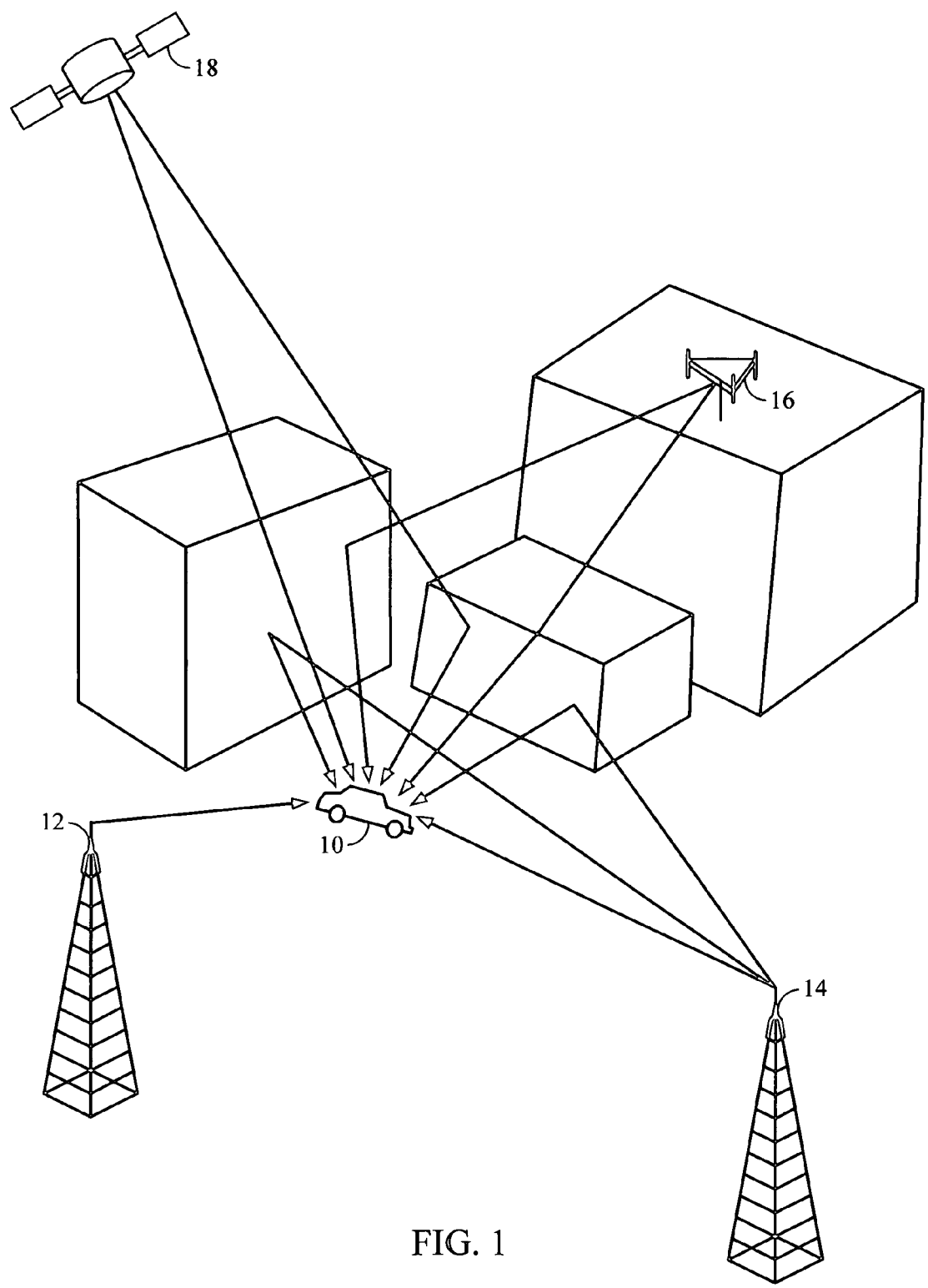
FIG. 1 illustrates multiple reception paths between transmission sources and a mobile unit.

The present invention uses a mathematical modeling technique to more accurately determine a time of arrival (TOA) of the signal transmitted from a base transceiver station (BTS). FIG. 1 is a diagram illustrating the operation of a wireless system using advanced forward link trilateration (AFLT) to determine the location of the mobile unit. As illustrated in FIG. 1, the mobile unit 10 is within range of a plurality of BTSs 12–16. To permit normal communication, such as voice communication, the mobile unit 10 establishes communication links with the BTSs 12–16, respectively. The information derived in the process of establishing the communication links may be used to estimate the TOA and thereby determine the location of the mobile unit 10 with respect to the BTSs 12–16. However, the multipath signals result in an alteration of the correlation pulse typically generated within the mobile unit 10 and leads to possible errors in calculating a precise TOA. The TOA measurement in the presence of multipath signals is not sufficiently accurate to determine the precise location of the mobile unit 10. The present invention derives more accurate TOA data that corrects for or compensates for multipath signals and permits a more precise determination of the location of the mobile unit 10.

Figure 2:
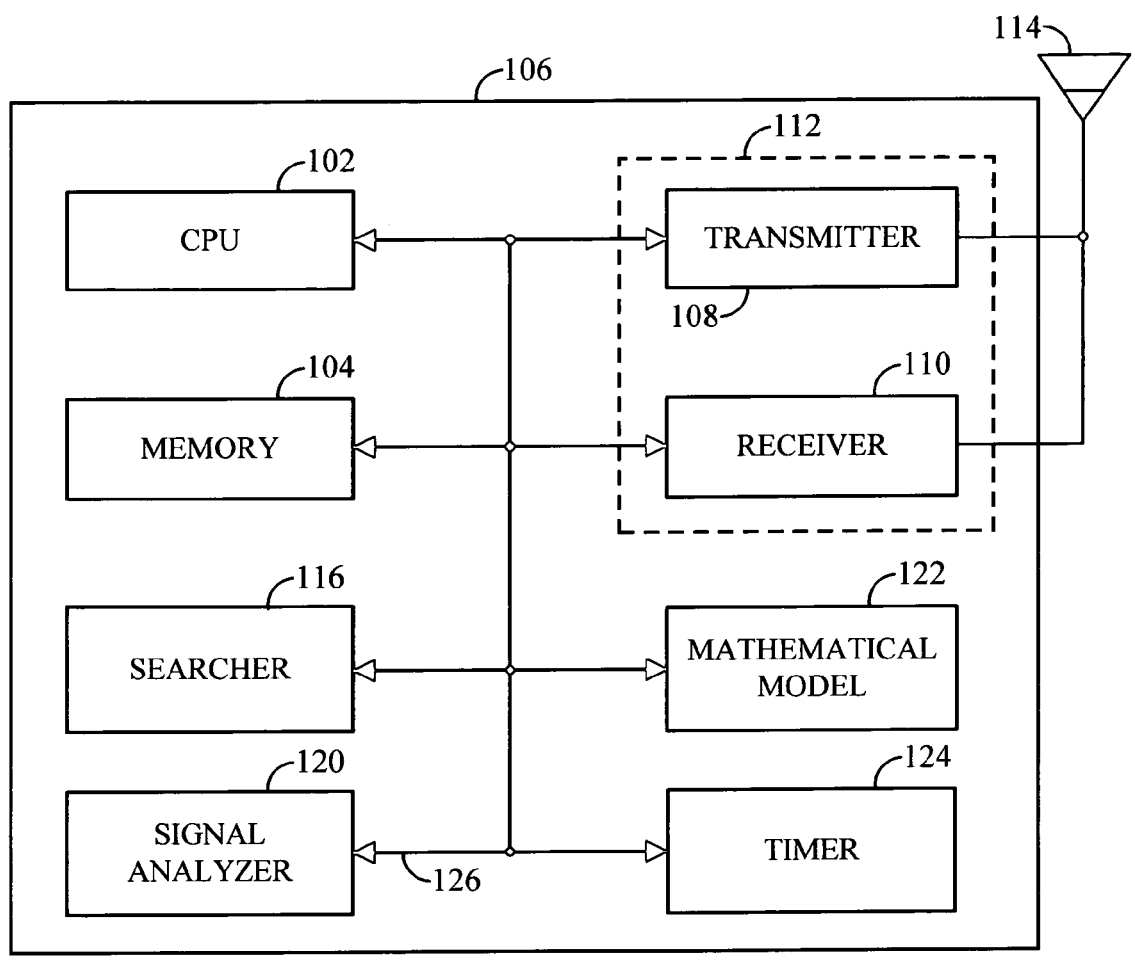
FIG. 2 is a functional block diagram of a system implementing the present invention.

The present invention is embodied in a system 100 illustrated in the functional block diagram of FIG. 2. The system 100 includes a central processing unit (CPU) 102, which controls operation of the system. Those skilled in the art will appreciate that the CPU 102 is intended to encompass any processing device capable of operating the telecommunication system. This includes microprocessors, embedded controllers, application specific integrated circuits (ASICs), digital signal processors (DSPs), state machines, dedicated discrete hardware, and the like. The present invention is not limited by the specific hardware component selected to implement the CPU 102.

The system also preferably includes a memory 104, which may include both read-only memory (ROM) and random access memory (RAM). The memory 104 provides instructions and data to the CPU 102. A portion of the memory 104 may also include non-volatile random access memory (NVRAM).

The system 100, which is typically embodied in a wireless communication device such as a cellular telephone, also includes a housing 106 that contains a transmitter 108 and a receiver 110 to allow transmission and reception of data, such as audio communications, between the system 100 and a remote location, such as a BTS (e.g., the BTS 12 of FIG. 1. The transmitter 108 and receiver 110 may be combined into a transceiver 112. An antenna 114 is attached to the housing 106 and electrically coupled to the transceiver 112. The operation of the transmitter 108, receiver 110, and antenna 114 is well known in the art and need not be described herein except as it relates specifically to the present invention.

In an implementation for a CDMA device, the system also includes a searcher 116 to detect and quantify the level of signals received by the receiver 110. The searcher 116 detects one or more parameters, such as a total energy, pilot energy per pseudo noise (PN) chip, power spectral density, and other parameters, as is known in the art. As will be described in greater detail, the searcher 116 performs a correlation analysis to determine time of arrival (TOA) from a location, such as the BTS 12 (see FIG. 1).

The searcher 116 performs a correlation analysis between a reference signal and a received signal and generates a correlation output signal. A signal analyzer or modeling processor 120 analyzes the correlation signals and uses a mathematical model 122 to generate accurate TOA data that compensates or corrects for multipath effects.

The system 100 includes a timer 124 to provide system timing that is used to measure delay times in the arrival of signals from different sources (e.g., the BTSs 12–16 and the satellite 18). The timer 124 may be a stand-alone device or part of the CPU 102.

The various components of the system 100 are coupled together by a bus system 126, which may include a power bus, a control signal bus, and a status signal bus in addition to a data bus. However, for the sake of clarity, the various buses are illustrated in FIG. 2 as the bus system 126.

One skilled in the art will appreciate that the system 100 illustrated in FIG. 2 is a functional block diagram rather than a listing of specific components. For example, although the searcher 116 and signal analyzer 120 are illustrated as two separate blocks within the system 100, they may be in fact embodied in one physical component, such as a digital signal processor (DSP). They may also reside as program codes in the memory 104, such code being operated on by the CPU 102. The same considerations may apply to other components listed in the system 100 of FIG. 2, such as the timer 124.

When a BTS is detected, the output of the searcher 116 is a pulse, which may be considered a correlation pulse. This correlation pulse may be used to measure the time of arrival of the signal from the BTS. However, the accuracy of such time of arrival measurements severely limits the accuracy of the position determination.

Figure 3:
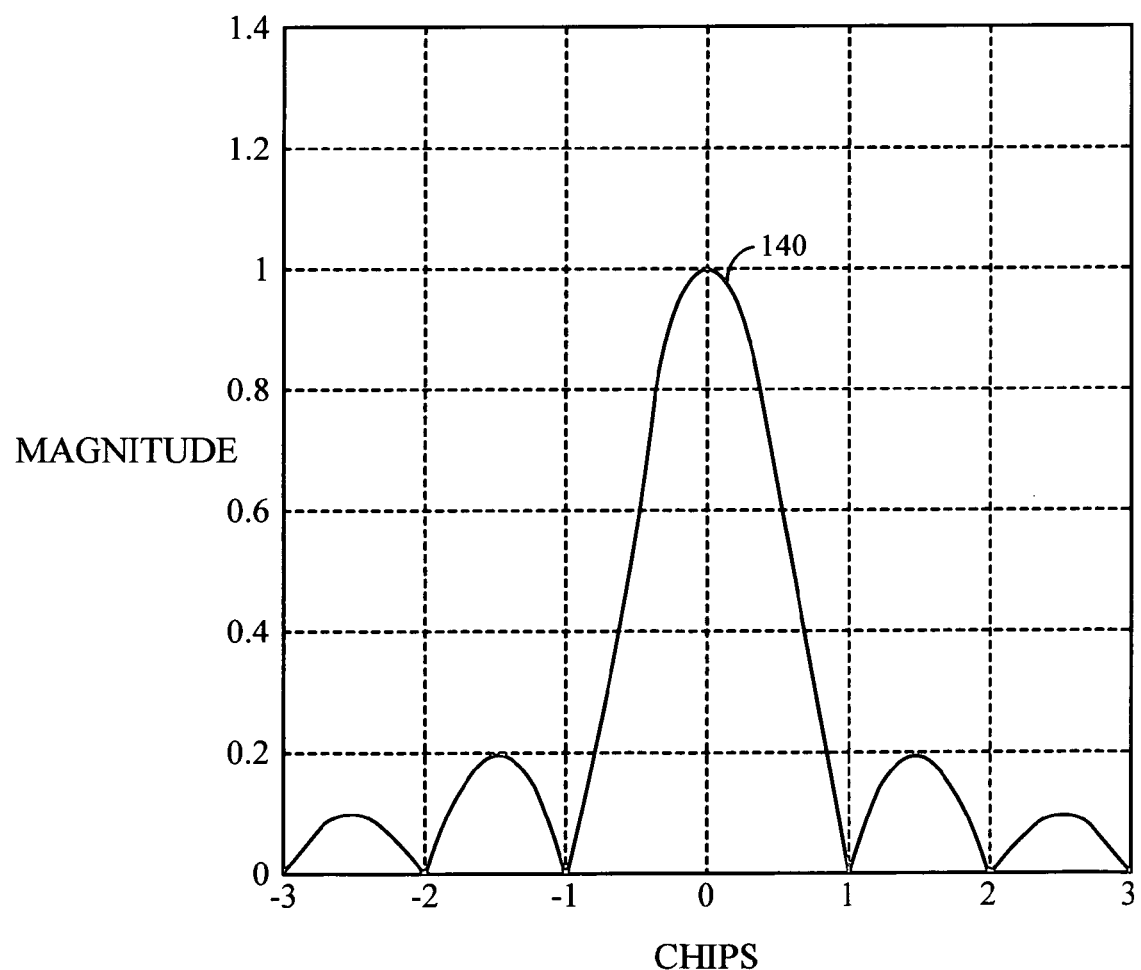
FIG. 3 is a waveform diagram illustrating the correlation signal generated by the system of FIG. 2 in the absence of multipath effects.

Operation of the components shown in the system 100 of FIG. 2 will be explained with reference to FIGS. 3–5. FIG. 3 is a waveform-timing diagram illustrating the magnitude of a typical correlation pulse generated by the searcher 116 in the absence of any multipath effects. To assist in proper understanding of the present invention, a brief description of TOA processing using, by way of example, a CDMA mobile unit, will be presented. A mobile unit (e.g., the mobile unit 10 in FIG. 1) implementing the system 100 of FIG. 2 is initially assigned a pseudo noise (PN) code. The PN code may be stored in the memory 104 as a local reference. When a base station (e.g., the BTS 12) transmits data to the mobile unit 10, the base station transmits the PN code. The system 100 continuously searches for a correlation between the local reference (i.e., the stored PN code) and transmitted data (i.e., the transmitted PN code).

As is well known in the art, all the transmitters (e.g., the BTSs 12–16) transmit the same PN code, but the start of transmission of the PN code from the transmitter in each BTS is delayed in time by a precisely known offset. The time offsets are measured in multiples of 64 chips. As those skilled in the art will appreciate, a "chip" is a single piece of data in the PN sequence. Because the data is transmitted at a known rate, chips may be used as a measure of time. Although the present description may be characterized in actual units of time, it is more convenient to refer to the time in terms of chips or portions of chips because the system 100 performs its analysis and measurements in terms of chips.

The PN offsets are selectively assigned to transmitters so that the offsets in a geographic region are spread out as much as possible to avoid interference between transmitters. The transmitters (e.g., the transmitters in the BTSs 12–16 may be identified by transmitted identification data, but are sometimes labeled by their PN offset time. For example, the transmitter in BTS 12 may be identified as PN 320 to indicate that it transmits the PN code at an offset of 320 chips. In the present example, the transmitters 14 and 16 may be identified as PN 448 and PN 640, respectively, to indicate the offset times at which each will transmit the PN code.

It should be understood, however, that regardless of how the transmitters are labeled, the relative offset of each with respect to each other can be established from the information encoded in the signals. The receiver 110 (see FIG. 2) in the mobile unit 10 will detect the PN from each of the transmitters in the geographic area (e.g., the transmitters in the BTSs 12–16).

When the PN code is transmitted from a BTS (e.g., the BTS 12) there may be a delay due to the PN offset assigned to each transmitter. In addition, there is a propagation delay that is indicative of the distance between the transmitter and the mobile unit 10. It is this propagation delay that can be measured by the system 100 to determine the location of the mobile unit. For example, the correlation pulse from the BTS with the lowest PN offset will arrive at the mobile unit 10 prior to arrival of signals from any other BTS. The system 100 must accurately determine the TOA of this first signal and may arbitrarily assign it to a time offset of zero. Subsequent correlation pulses from other BTSs and/or satellites (e.g., the satellite 18) will also be detected by the mobile unit 10, but with additional delays that are the result of the PN offset and the propagation delay. The delay associated with the PN offset is precisely known. Thus, a residual delay is propagation delay as a result of the distance between the BTS and the mobile unit 10 plus an error factor due to the absence of a line of sight between the network antenna and the mobile unit.

As one skilled in the art can appreciate, a slight error in the measurement of the correct TOA will result in significant errors in the location determine process. That is, slight errors in the TOA, which may be caused by multipath effects, will result in errors in the AFLT calculation. The system 100 provides a technique to compensate for multipath effects and thus provide a more accurate TOA. The actual process of location of the mobile unit 10 using triangulation based on delay of TOA is known in the art and need not be described in greater detail herein. However, it should be clear that any measurement based on TOA will be affected by errors in the TOA. Multipath effects provide one significant source of such errors. The system 100 reduces the effects of multipath errors and thus provides more accurate TOA determination.

The searcher 116 shifts the stored reference until a correlation is detected between the stored reference and the transmitted data. The degree of shift of the stored reference is selected to optimize the acquisition rate and provide sufficient synchronization between the wireless device 10 and a particular BTS (e.g., the BTS 12 of FIG. 1). This is illustrated in the waveform of FIG. 3. In the example illustrated in FIG. 3, no multipath effects are present and a correlation waveform 140 has a maximum value at chip 0.

A number of different measures, such as total energy, pilot energy per PN chip or power spectral density, may be used as the correlation value. One commonly used measure is simply the received signal strength such as may be indicated by the received signal strength index (RSSI). Those skilled in the art will recognize that the searcher 116 (see FIG. 1) produces numeric values related to the correlation between the stored PN code and the transmitted PN code. The waveform 140 results from plotting the correlation values from the searcher at different chip values.

The waveform of FIG. 3 shows a sample correlation output generated by the searcher 116 (see FIG. 2) from a single BTS (e.g., the BTS 12) in the absence of any multipath signals. The searcher 116 shifts the reference data (i.e., the stored PN) one-half chip at a time until it detects a correlation between the reference data and the received data.

The data transmitted from the transmitter 12 also includes identification data such that the mobile unit 10 implementing the system 100 can identify the transmitter 12 as the source of the detected correlation signal. In addition to the transmitter 12, the mobile unit 10 implementing the system 100 will receive data from the transmitters 14–16.

In addition, the mobile unit 10 implementing the system 100 may detect pulses from additional base station transmitters (not shown) or from satellites using global positioning system (GPS) signals (e.g., the satellite 18). As is known in the art, GPS also uses time of arrival data in order to determine the location of the mobile unit 10. In an exemplary embodiment, the mobile unit 10 determines time of arrival data from four or more different transmitters. In the absence of any multipath effects, the pulse illustrated in waveform of FIG. 3 provides a relatively accurate measure of time of arrival and thus can be used in conjunction with correlation pulses from other BTSs or satellites to accurately determine the location of the mobile unit 10.

Unfortunately, multipath effects are present in almost all TOA measurements. Although satellite signals using GPS location technology tend to have less multipath effects, these effects are still present. Multipath effects from GPS satellites (e.g., the GPS satellite 18) are particularly prevalent in urban areas where buildings and other man-made structures interfere with the GPS signal. Terrestrial systems, such as the transmitters 12–16 (see FIG. 1) are also affected by man-made structures such that signals are defracted and/or reflected. As a result, the mobile unit 10 receives multiple closely spaced images of the same signal. The system 100 is capable of estimating the error resulting from such multipath effects. These multipath effects may be termed "short multipath effects" because the multiple signals generally are delayed only a small amount of time and may arrive at the antenna 114 (see FIG. 2) of the system 100 such that the respective times of arrival are too close to produce different peaks in the overall correlation function. That is, the signals arrive within such a short period of time that the output from the searcher 116 is a distorted pulse that results from the overlapping effects of the multiple detected signals.

In the previous example discussed with respect to the waveform of FIG. 3, the mobile unit 10 receives a single signal from the transmitter 12 with no multipath signals. The effect of the multiple signals is illustrated in the waveform of FIG. 4 where the searcher 116 shows a correlation value resulting from two signals 142 and 144 that are in-phase and arrive at the mobile unit 10 within one chip of each other. The additive effects of the two in-phase signals are shown in a waveform 146 that has a single peak with a higher than normal magnitude and with a much broader pulse width as a result of multiple receptions of the same signal within a short period of time. Instead of a relatively narrow pulse at 0.0 chips, as shown in the waveform of FIG. 3, the searcher 116 generates a broad pulse that is centered at approximately 0.5 chips. This error makes it difficult to accurately determine the TOA because systems are designed to detect the peak signal. Thus, the multipath effects cause a broadening of the correlation pulse with the resultant error in the true TOA.

Figure 5:
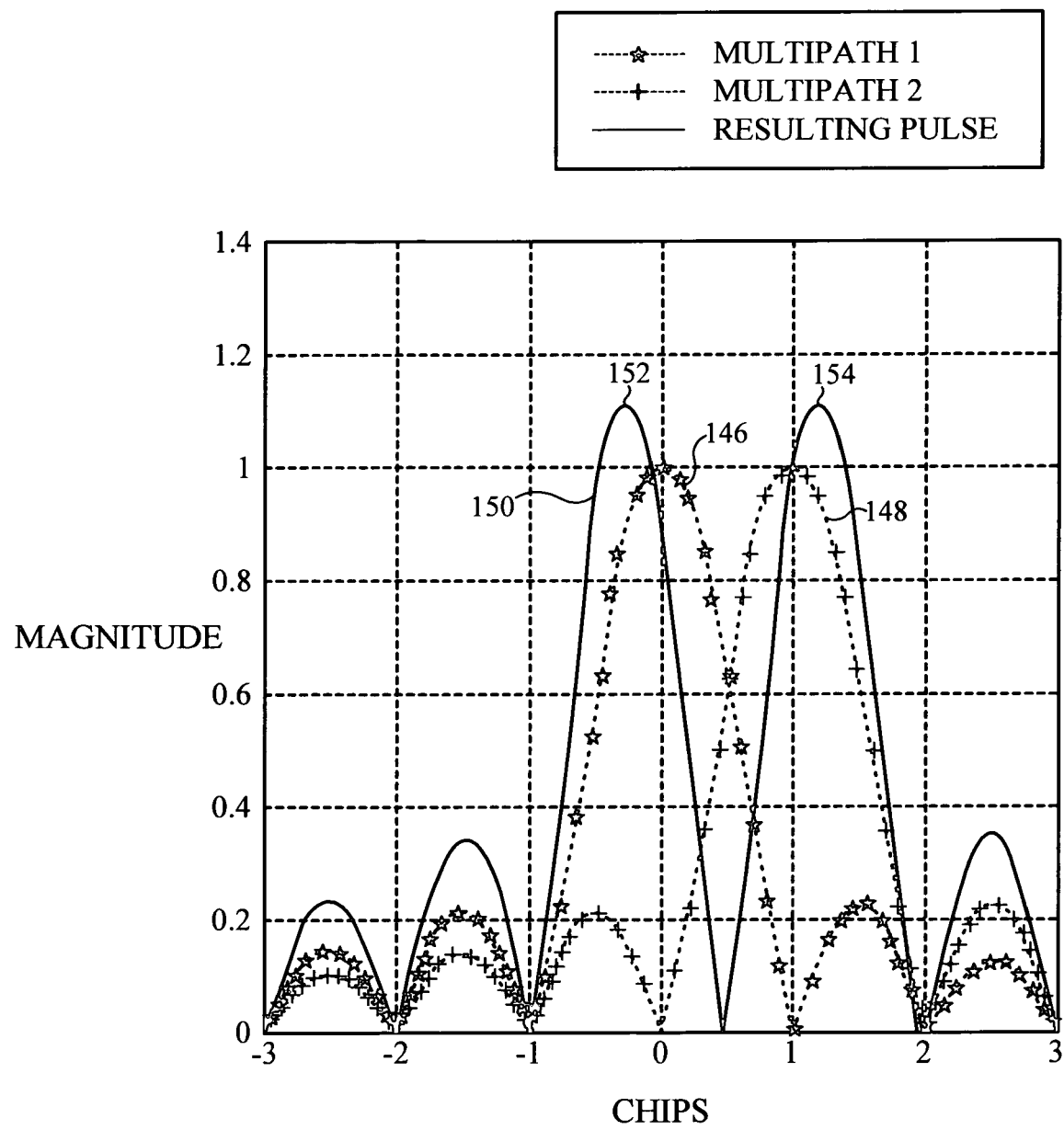
FIG. 5 is a waveform diagram illustrating a correlation signal generated by the system of FIG. 2 in the presence of out-of-phase multipath signals.

The waveform of FIG. 5 illustrates the output generated by the searcher 116 (see FIG. 2) resulting from two signals 146 and 148 that are out-of-phase and arrive at the mobile unit 10 within one chip of each other. The additive effects of the two out-of-phase signals is a waveform 150 having two peaks 152 and 154, respectively. The peaks 152 and 154 have a magnitude that is slightly higher than normal and a pulse width that is more narrow than normal. Instead of a single pulse at 0.0 chips, as shown in the waveform of FIG. 3, the searcher 116 generates two narrow pulses with peaks 152 and 154 at approximately −0.25 chips and +1.25 chips, respectively. This error makes it difficult to accurately determine TOA.

Figure 4:
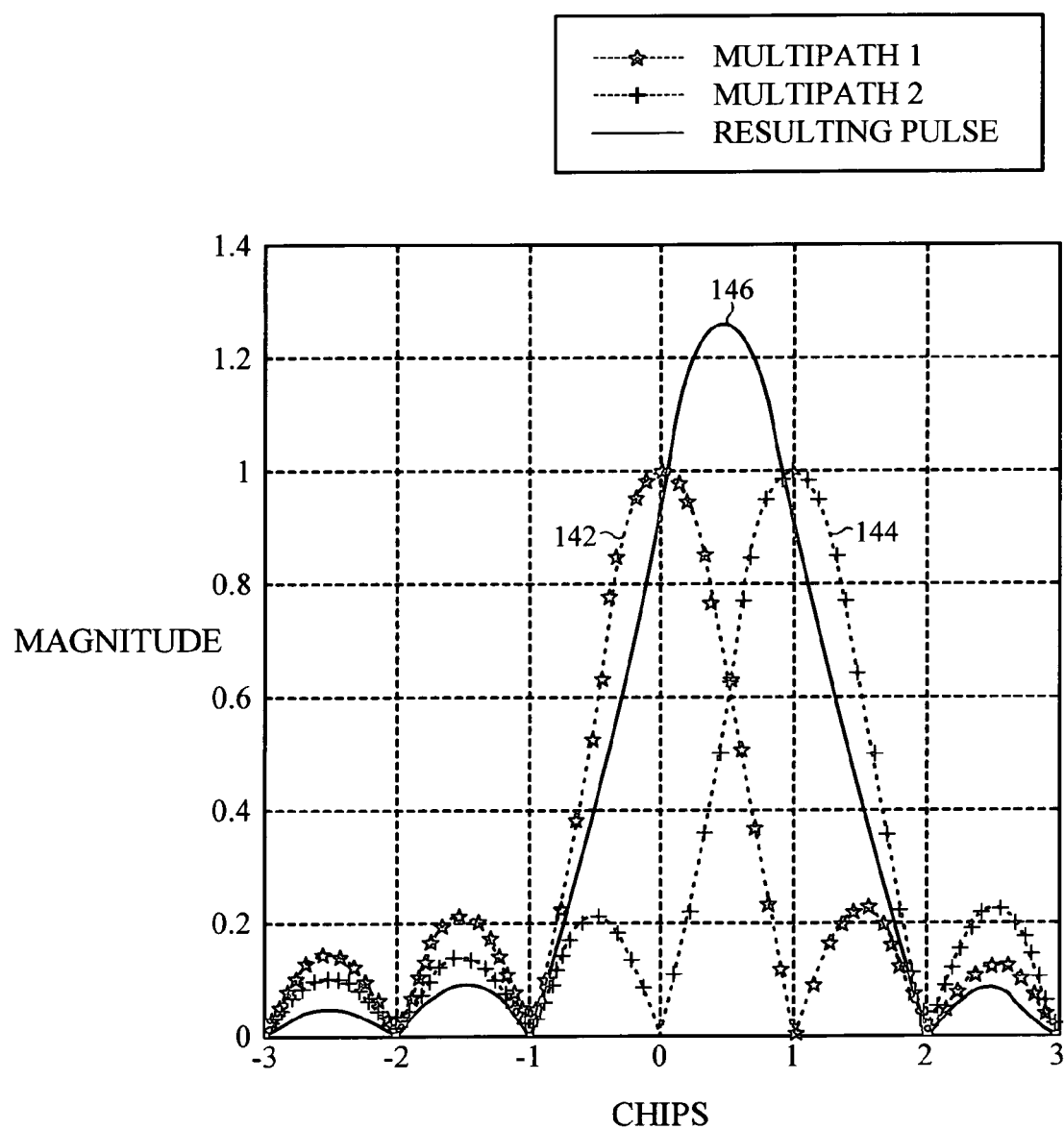
FIG. 4 is a waveform diagram illustrating a correlation signal generated by the system of FIG. 2 in the presence of in-phase multipath signals.

It should be noted that the effects illustrated in the waveforms of FIGS. 4 and 5 are illustrative only. Many multipath effects may result in more signals arriving in-phase and out of phase at the antenna 114 (see FIG. 2) such that the searcher 116 generates multiple peaks associated with a single signal. The present invention provides at least partial compensation for the errors that result from multipath effects. The compensation system described herein is not limited to the waveform shapes or excess delay times illustrated in FIGS. 3 and 4.

The system 100 uses the mathematical model 122 to simulate the general curve of the correlation response function. The shape of the curve and the actual peak and pulse width can be readily determined using a relatively low number of sample points. In an exemplary embodiment, the response function is modeled by a simple quadratic function having the form:

$$y(x)=ax^2+bx+c \qquad (1)$$

where y(x) equals the correlation output value (e.g., RSSI) as a function of x, x equals a chip value and a, b, and c are coefficients. The coefficients a, b, and c may be readily determined using the correlation values at three sample points. The first sample point is the chip value at which the maximum signal level was detected. This is sometimes referred to as the "on-time" energy value and may be mathematically referred to with respect to equation (2) above as y(0). The two remaining values are the correlation values at adjacent sample points. In the example above wherein the searcher 116 searches at ½-chip increments, the correlation value at ½ chip before the on-time value and ½ chip after the on-time value are used to determine the coefficients a, b, and c. These may be referred to as the "early" energy value and a "late" energy value and are referred to with respect to equation (1) above as y(−0.5) and y(0.5), respectively.

The coefficients a, b, and c may be readily determined using the following:

$$a=2y(0.5)+2y(-0.5)-4y(0) \qquad (2);$$

$$b=y(0.5)-y(-0.5) \qquad (3);$$

and $$c=y(0) \qquad (4).$$

Figure 6:
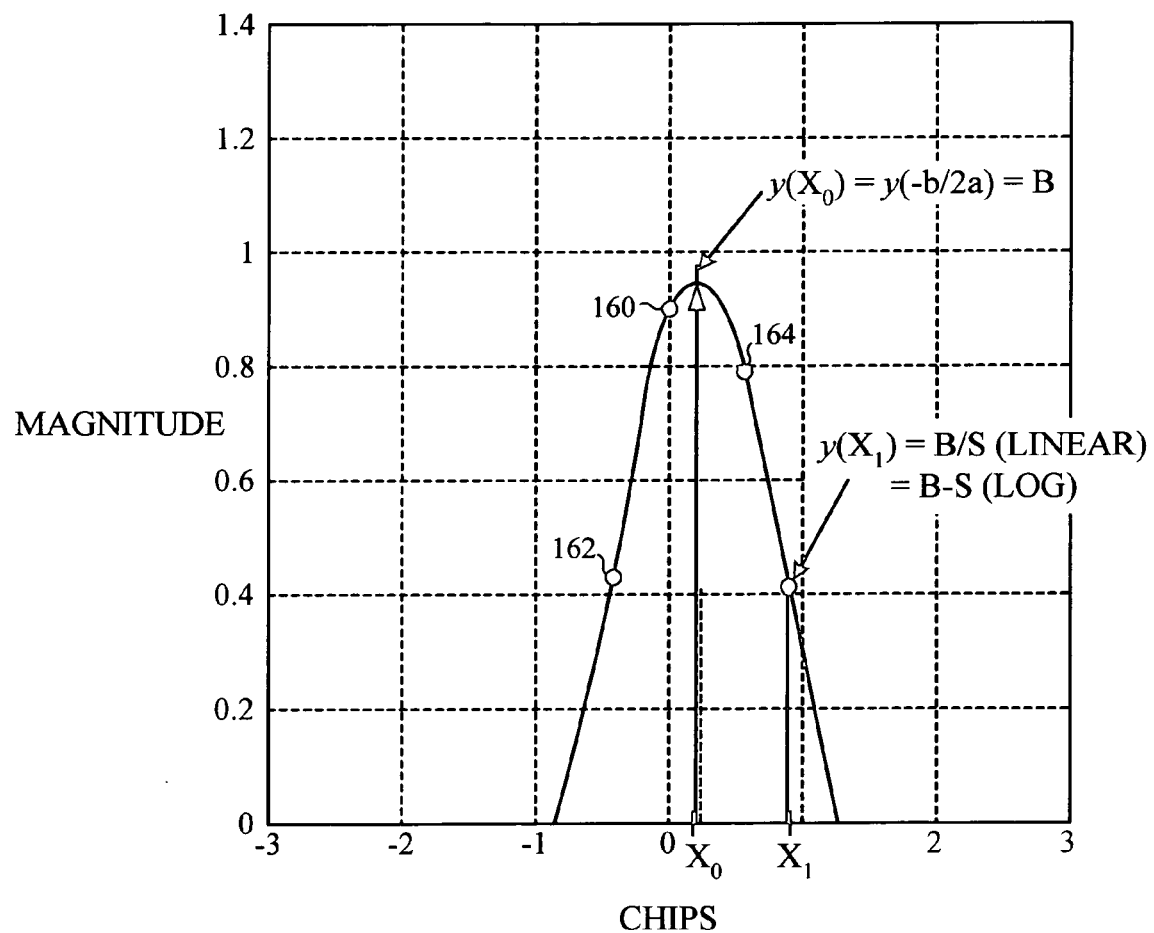
FIG. 6 is a waveform illustrating a modeling function used by the present invention to more accurately determine the time of arrival.

The modeling of the response function by the quadratic equation permits an accurate determination of the actual peak location and the simple calculation of pulse width. With respect to the actual peak location, FIG. 3 illustrates the response function from the searcher 116 (see FIG. 2) as precisely located at 0 chips. However, those skilled in the art will appreciate that the search 116 shift the stored PN code in one-half-chip increments. Thus, the resolution of the searcher is plus or minus one-quarter chip. That is, the actual peak location may be as much as a quarter chip away from the location determined by the searcher 116. However, the signal analyzer 120 can accurately determine the actual peak location using the coefficients a, b and c. Once the actual peak location has been determined, the signal analyzer makes a determination of the actual pulse width using the mathematical model 122. The waveform of FIG. 6 illustrates the modeling of the response function by the quadratic equation where the maximum correlation value (e.g., RSSI) was detected at chip 0 and is indicated by a reference numeral 160. The correlation value for the early energy value (i.e., at −0.5 chips) is indicated by a reference numeral 162, while the correlation value for the late energy value (i.e., at chip 0.5) is indicated by a reference numeral 164. The correlation values at the points 160–164 may be inserted in equations (2)–(4) above to determine the values for the coefficients a, b, c. Looking at the waveform of FIG. 5, it is possible to determine that the peak value is somewhere between chip 0 and 0.25. However, it is possible to determine the exact location of the peak using simple mathematics. Equation (2) is a simple quadratic equation whose derivative may be expressed by $$y'(x)=2ax+b \qquad (5).$$

The slope of the equation is equal to zero at the peak. By setting equation (5) to zero, we may solve for x and find that:

$$x=\frac{-b}{2a}. \qquad (6)$$

Thus, the peak may be readily determined by calculating the coefficients a and b.

In order to compute the pulse width, it is possible to rewrite equation (1) in the following manner:

$$y(x) = A(x-x_0)^2 + B \quad (7).$$

The curve represented by equation (7) is also a parabola whose maximum point is:

$$Y(x_0) = B \quad (8).$$

From the equations, it is easy to see that A=a and that the peak position can be represented as:

$$B = c - \frac{b^2}{4a}. \quad (9)$$

The system 100 allows the pulse width to be readily determined by calculating the point at which the parabola has decayed δ times from the maximum value. The point may be calculated in linear or logarithmic space. If the value is calculated in log space, the pulse width is determined at a point that is δ decibels (dB) below the maximum value. The set of equations below illustrate the solution in linear space:

$$A(x_1 - x_0)^2 + B = \frac{B}{\delta} \quad (10)$$

$$PW = x_1 - x_0 = \sqrt{\frac{(\delta-1)B}{A \cdot \delta}}$$

$$A(x_1-x_0)^2 + B = B - \delta$$

$$PW = x_1 - x_0 = \sqrt{\frac{-\delta}{A}} \quad (11)$$

The term δ is used to represent the amount of decay on the parabola from the peak point (i.e., the point $x_0$). The system 100 dynamically alters the factor δ to accommodate an increase or decrease in the signal-to-noise ratio (SNR). For example, in one embodiment, the system 100 may select δ to have a value of 10. That is, the pulse width is determined from a point on the parabola where the value has decreased from the peak by a factor of 10. However, in the presence of noise (e.g., a decreased SNR), the value δ may be decreased to compensate for the fact that the peak may not be as high in the presence of noise. Alternatively, the factor δ may be increased in a low-noise situation (i.e., increased SNR) to take into account the fact that the pulse may be more pronounced in the absence of noise. Thus, the system 100 advantageously allows the factor δ to be dynamically altered to provide more reliable determination of pulse width.

Several simulation studies have shown that the peak width of the multipath signal is either larger (when the individual peaks are in-phase, as shown in FIG. 4) or smaller (when the individual peaks are out-of-phase, as shown in FIG. 5) than the normal correlation pulse illustrated in FIG. 3.

The signal analyzer 120 (see FIG. 2) calculates the pulse width in the manner described above. Based on the pulse width it is possible to determine whether the received signal is a normal signal or a multipath signal. Further, it is possible to determine whether the multipath signal results from in-phase multipath signals, such as illustrated in FIG. 4 or out-of-phase multipath signals, such as illustrated in FIG. 5.

Once the signal analyzer 120 has determined the type and degree of multipath signal, a correction factor may be added to the peak location to compensate for the multipath signals and provide a more accurate TOA determination. Table 1 below is used to provide correction factors to compensate for multipath signals.

TABLE 1

| normal/multipath case | Adjustment amount | |
|---|---|---|
| | Individual paths in-phase | Individual paths out-of-phase |
| Normal path | 0 | 0 |
| 2 paths ¼ chip apart | −1/8 | 1/8 |
| 2 paths ½ chip apart | −1/4 | 1/4 |
| 2 paths 1 chip apart | −1/2 | 1/2 |

The signal analyzer 120 adds or subtracts chips or parts of chips to the location of the peak value (i.e., the point $x_0$) to compensate for multipath effects. As illustrated in table 1, the signal analyzer subtracts incremental chip amounts for in-phase multipath signals and adds additional amounts for out-of-phase multipath signals. As those skilled in the art can appreciate, the more accurate TOA signals provided by the system 100 result in a more accurate location determination for the mobile unit 10.

Under current telecommunication standards, such as IS-801, the CDMA standard for position location, the mobile unit 10 may be capable of performing calculations using TOA data to determine its location. However, the location of the mobile unit 10 may be determined by portions of the fixed infrastructure as well. In this embodiment, the mobile unit transmits identification data and delay measurement data to a remote location, such as the BTS 14. A position determining entity (PDE) associated with the BTS 14 performs the calculations and determines the location of the mobile unit 10 based on the known locations of the various transmitters and the delay data measured from each transmitter.

As previously noted, the PDE may be implemented within the mobile unit 10 itself provided that the mobile unit is given the precise location of the various transmitters. Under current telecommunication standards, this information is not provided to the mobile units, but is provided to the various base stations. If the PDE is associated with a base station (e.g., the BTS 12), the mobile unit transmits the detected PN numbers and delay times to the PDE associated with the BTS 12. The delay times may include the measured delay times and correction factors, or may include the corrected delay times only. In yet another alternative embodiment, the system 100 may transmit the measured pulse widths to the PDE associated with, by way of example, the BTS 12 to allow the calculation of correction factors within the PDE. The present invention is not limited by the location at which the correction factors are calculated and applied to the measured delay times nor is it limited to the location of the PDE.

In most applications, the second order model of equation (1) is generally satisfactory for determining the TOA in the presence of multipath signals and provides an acceptable degree of accuracy in determining the position of the mobile unit 10 (see FIG. 1) using conventional AFLT techniques. However, if greater accuracy is desired, it is possible to provide a higher order mathematical model to simulate the correlation response function. For example, a third order equation may more closely model the desired function. Those skilled in the art will recognize that high order functions will require a greater number of sample points in order to determine the coefficients. However, the mathematical modeling of the response function may still be performed efficiently by the present invention. The principles of the present invention may be generalized to third order or any other higher order model. The second order function is selected as a trade-off between accuracy and processing time. It should be noted that, in the case of a quadratic equation, the three calculated data points (i.e., the early energy value, the on-time energy value, and the late energy value) all intersect with the actual response function and thus provide an acceptable degree of accuracy in determining the precise location of the peak and the pulse width.

Figure 7:
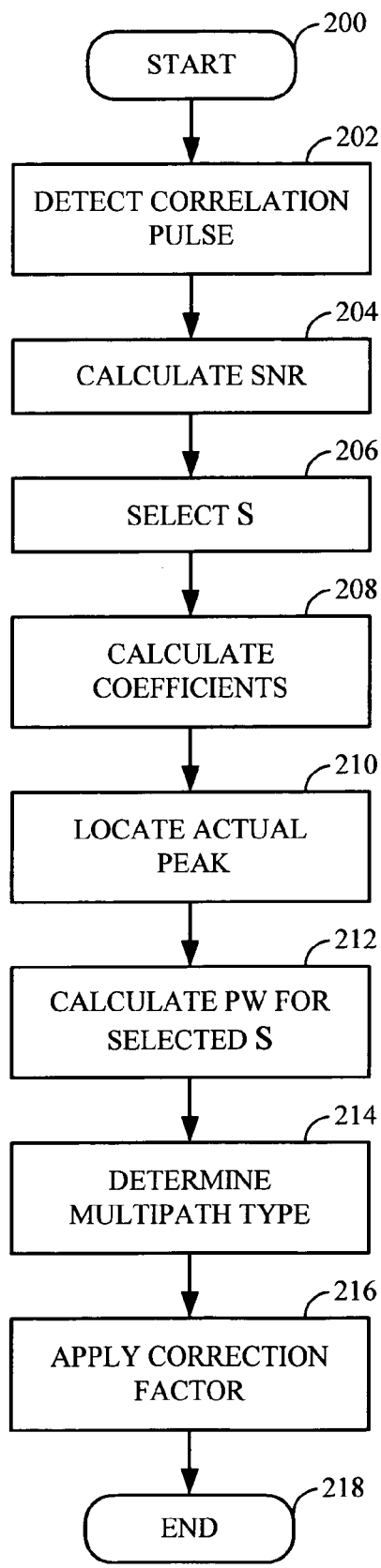
FIG. 7 is a flowchart illustrating the operation of the invention.

The operation of the system 100 is illustrated in the flow chart of FIG. 7 where at a start 200, the mobile unit 10 is under power. In step 202, the system 100 detects the correlation pulse and calculates a correlation value. As is known in the art, the correlation value may be indicated by many different types of measurements, such as total energy, pilot energy per PN chip, RSSI, or the like. The mobile unit 10 compares a stored PN code with a PN code received by the receiver 110 (see FIG. 2). If the PN codes match, a relatively high correlation value will be calculated in step 202.

In step 204, the system 100 determines the SNR in a conventional manner. For example, the peak correlation value may be compared with the background noise floor to determine the SNR.

In step 206, the system 100 selects a value for the parameter δ based on, by way of example, the SNR calculated in step 204. The factor δ may be calculated using other factors, such as the total energy, pilot energy per pseudonoise (PN) chip, power spectral density, and other parameters, as are known in the art.

In step 208, the signal analyzer 120 (see FIG. 2) calculates coefficients associated with the mathematical model 122. In the example where a quadratic equation is used to model the response function, the peak energy signal determined by the searcher 116 and the early energy value and late energy value are used to determine the coefficients. In step 210, the signal analyzer 120 determines the actual peak location.

In step 212, the signal analyzer determines the pulse width for the selected value of δ. That is, the signal analyzer 120 utilizes the calculated coefficients and the selected value for δ to determine the pulse width. In step 214, the signal analyzer 120 determines the multipath type. For example, the signal analyzer may determine that the multipath signal results from in-phase multipath signals that are one-half chip apart. In step 216, the signal analyzer applies the appropriate correction factor using, by way of example, the data provided in Table 1. In the example discussed above, the signal analyzer subtracts a quarter chip from the calculated TOA to compensate for the multipath effects. The process ends at 218 with the system 100 having compensated for multipath effect signals and providing a more accurate TOA.

Those skilled in the art will appreciate that the process described above is used to correct for multipath effects from one base station or satellite (e.g., the BTS 12). The same process is applied to the correlation signals from other BTSs (e.g., the BTSs 14–16) or signals from a GPS satellite (e.g., satellite 18). Thus, the system 100 provides compensation for multipath effects from any BTS or satellite and provides more accurate TOA data. On the basis of the corrected TOA data, a more accurate location determination may be made.

The actual calculation of location based on TOA data is known in the art and need not be described herein. However, it follows that the more accurate TOA data provided by the system 100 results in a more accurate calculation of the location of the mobile unit 10. Such increased accuracy can be critical in locating the mobile unit 10 if emergency services are required by the user.

Although the system 100 has been described with respect to two multipath signals, the principles of the present invention may be extended to three or more multipath signals. Alternatively, the system 100 can reasonably model the effects of three or more multipath signals using the system described above. The resultant increase in TOA data accuracy provides a more accurate determination of the location of the mobile unit 10.

It is to be understood that even though various embodiments and advantages of the present invention have been set forth in the foregoing description, the above disclosure is illustrative only, and changes may be made in detail, that remain within the broad principles of the invention. Therefore, the present invention is to be limited only by the appended claims.

All of the above U.S. patents, U.S. patent application publications, U.S. patent applications, foreign patents, foreign patent applications and non-patent publications referred to in this specification and/or listed in the Application Data Sheetare incorporated herein by reference, in their entirety.

What is claimed is:

1. A system for the correction of multipath errors in a telecommunication device, comprising:
    a searcher to analyze received signals to determine a correlation signal level at predetermined points in time, the searcher determining a maximum signal level at a selected one of the predetermined points in time; and
    a signal analyzer to generate a mathematical model of a predetermined response function using the maximum signal level and correlation signal levels from predetermined points in time adjacent the selected time, the signal analyzer using the mathematical model to determine an actual peak level and a pulse-width associated with the predetermined response function and applying a correction factor to a time of arrival based on the pulse width to generate a corrected time of arrival.

2. The system of claim 1 wherein the pulse width is determined at a point where the correlation signal level is less than the actual peak level by a predetermined amount.

3. The system of claim 2 wherein the signal analyzer dynamically selects the predetermined amount.

4. The system of claim 2 wherein the signal analyzer selects the predetermined amount based on a signal to noise ratio of the received signal.

5. The system of claim 1 wherein the correlation signal levels are based on received signal strength of the received signals.

6. The system of claim 1 wherein the maximum signal level and correlation signal levels from predetermined points in time adjacent the selected time are used to determine coefficients in the mathematical model.

7. The system of claim 6 wherein the coefficients in the mathematical model are used to determine pulse width of the mathematical model.

8. The system of claim 1 wherein the mathematical model is a second-order mathematical function.

9. The system of claim 1 wherein the mathematical model is a mathematical function greater than a second order, the maximum signal level and correlation signal levels from predetermined points in time adjacent the selected time being used to determine coefficients in the mathematical model.

10. A system for the correction of multipath errors in a telecommunication device, comprising:
  means for analyzing received signals to determine a correlation signal level at predetermined points in time;
  means for determining a maximum signal level at a selected one of the predetermined points in time; and
  analysis means for generating a mathematical model of a predetermined response function using the maximum signal level and correlation signal levels from predetermined points in time adjacent the selected time, the analysis means using the mathematical model to determine an actual peak level and a pulse-width associated with the predetermined response function and applying a correction factor to a time of arrival based on the pulse width to generate a corrected time of arrival.

11. The system of claim 10 wherein the analysis means determines the pulse width at a point where the correlation signal level is less than the actual peal level by a predetermined amount.

12. The system of claim 11 wherein the analysis means dynamically selects the predetermined amount.

13. The system of claim 11 wherein the analysis means selects the predetermined amount based on a signal to noise ratio of the received signal.

14. The system of claim 10 wherein the correlation signal levels are based on received signal strength of the received signals.

15. The system of claim 10 wherein the analysis means uses a second-order mathematical function as the mathematical model.

16. The system of claim 10 wherein the analysis means uses a mathematical model greater than a second order.

17. A method for the correction of multipath errors in a telecommunication device, comprising:
  analyzing received signals to determine a correlation signal level at predetermined points in time;
  determining a maximum signal level at a selected one of the predetermined points in time;
  generating a mathematical model of a predetermined response function using the maximum signal level and correlation signal levels from predetermined points in time adjacent the selected time; and
  using the mathematical model to determine an actual peak level and a pulse-width associated with the predetermined response function and applying a correction factor to a time of arrival based on the pulse width to generate a corrected time of arrival.

18. The method of claim 17 wherein determining the pulse width determines the pulse width at a point where the correlation signal level is less than the actual peak level by a predetermined amount.

19. The method of claim 18, further comprising dynamically selecting the predetermined amount.

20. The method of claim 18, further comprising selecting the predetermined amount based on a signal to noise ratio of the received signal.

21. The method of claim 17 wherein the correlation signal levels are based on received signal strength of the received signals.

22. The method of claim 17 wherein the mathematical model is a second-order mathematical function.

23. The method of claim 17 wherein the mathematical model is a mathematical model greater than a second order.

* * * * *